United States Patent
Lytle, Jr.

(10) Patent No.: US 8,253,572 B2
(45) Date of Patent: Aug. 28, 2012

(54) ELECTRONIC TETHER SYSTEM AND METHOD WITH RATE OF CHANGE DETECTION AND VEHICLE BRAKING FEATURES

(76) Inventor: Bradley D. Lytle, Jr., Vienna, VA (US)

( * ) Notice: Subject to any disclaimer, the term of this patent is extended or adjusted under 35 U.S.C. 154(b) by 402 days.

(21) Appl. No.: 12/656,255

(22) Filed: Jan. 22, 2010

(65) Prior Publication Data
US 2011/0181423 A1    Jul. 28, 2011

(51) Int. Cl.
*G08B 23/00* (2006.01)
(52) U.S. Cl. ............ 340/573.3; 119/796; 119/771; 701/70
(58) Field of Classification Search .......... 340/573.3; 119/796, 771; 701/70
See application file for complete search history.

(56) References Cited

U.S. PATENT DOCUMENTS

2005/0005876 A1* 1/2005 Calvi ............ 119/771
2008/0114519 A1* 5/2008 DuFaux et al. ......... 701/70

* cited by examiner

*Primary Examiner* — Jennifer Mehmood
*Assistant Examiner* — Naomi Small
(74) *Attorney, Agent, or Firm* — Bradley D. Lytle

(57) ABSTRACT

A dynamically controlled retractable tether provides a mechanism by which a pet can be safely exercised on a bicycle or other vehicle. The pet avoids injury when running in front of the bicycle and stopping short, by having a detector detect the relative motion of the pet and the bicycle so as to automatically apply brakes to the bicycle prior to the pet being injured. Variations include a zone detection mechanism that detects a relative position of the pet relative to the bicycle, and uses a different set of braking parameters, depending on the zone in which the pet is located.

20 Claims, 12 Drawing Sheets

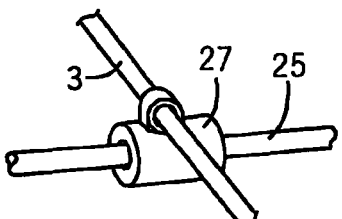
FIG. 4
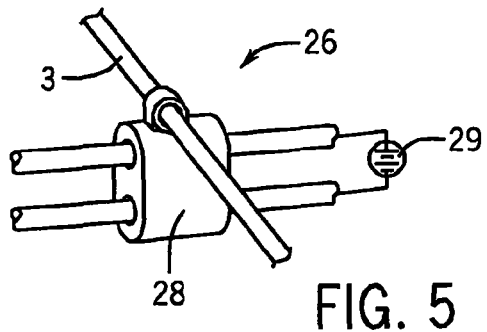
FIG. 5
FIG. 6
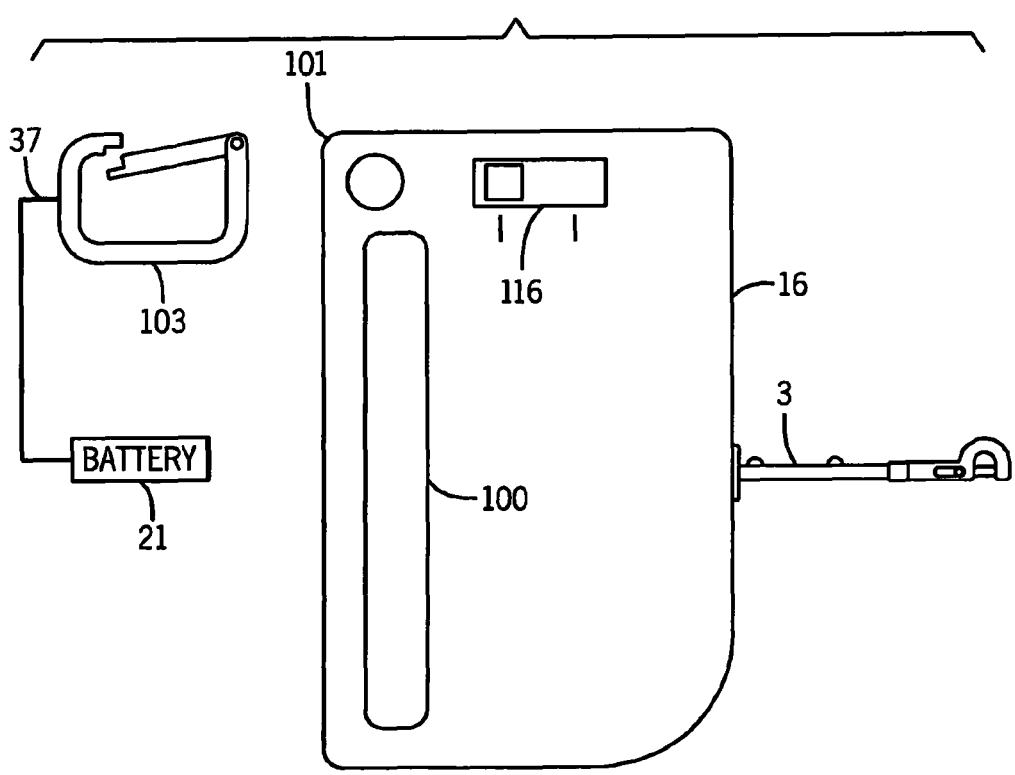

| DISTANCE (FT') | RATE OF CHANGE | ZONE | BRAKE VALVE (STEPS) | LOCK | ALARM | SHOCK |
|---|---|---|---|---|---|---|
| 0 | 0 | 1,2,OR 3 | 0 | 0 | 0 | 0 |
| . . . | | | | | | |
| 25 | - MAX | 1 | 5 | 0 | 1 | 1 |
| 25 | -1/2 MAX | 1 | 0 | 0 | 0 | 0 |

FIG. 10

ELECTRONIC TETHER SYSTEM AND METHOD WITH RATE OF CHANGE DETECTION AND VEHICLE BRAKING FEATURES

BACKGROUND OF THE INVENTION

1. Field of the Invention

The present invention is directed to systems, methods and computer program product for detecting, monitoring and changing an observed relative motion between a person on a wheeled, moving vehicle and a pet that is tethered to the moving vehicle.

2. Discussion of the Background

Some dogs are more trainable than others. While some dogs may readily take to jogging next to his or her master's side, other dogs do not stay on the master's heel when jogging. The problem is even worse if the dog needs more exercise than a mere walk with the master. Celebrities such as Ceasar Milan, host of the TV show "The Dog Whisperer" strongly encourage walking or running with a dog to promote good social habits for the dog and also keep the dog healthy. For particularly active dogs that need a lot of exercise, Ceaser Milan wears in-line skates which enables the dog to run ahead of the master and pull the master behind him. Not everyone is skillful with in-line skates, especially when being pulled by a dog. It is possible to ride a bicycle while holding a dog leash, but a bicycle is a substantial machine and could possibly cause injury to an untrained dog (or person) if the master is not quick enough to avoid rapid change of pace by the dog.

Moreover, holding the leash of an untrained dog while riding a bicycle or wearing in-lines skates can be perilous for the dog and the master alike. The dog may not closely follow the bicycle and abruptly change his direction, causing the leash to be yanked and the master to lose his balance and possibly give rise to an accident.

While is it possible to use mechanical methods such as a physical barrier (like a "cow catcher" on old steam trains) to prevent the dog from being run-over, such barriers themselves would need to be large, and would not necessarily prevent the dog from being injured when the dog stops or changes course abruptly.

As recognized by the present inventor, if the dog is running in front of the bicycle, and the dog stops short, unless the master immediately applies the brakes, there is a risk that the bicycle will run over the dog. As such, some positions of the dog relative to the moving direction of the master are more dangerous than others. While the physical barrier could be more substantial in the more dangerous areas, such as directly in front of the bicycle's front wheel, it nevertheless might be insufficient for large dogs, and too forceful on smaller dogs.

Some dog leashes have an ability to pay-out and also self retract depending on how much tension the dog exerts on the leash. However the leash has a finite length and thus even when the dog reaches the end of the leash, the dog may impart a large abrupt tug on the leash which may cause the master to lose her grip or balance. These dog leashes have a built in lock, which converts the adjustable length leash to a fixed length leash. Such leashes also have locking mechanism that is actuated by the master's thumb depressing a button. Modulating a downward pressure on the button can cause a breaking force on the dog, but it has no effect on the bicycle or skates that the master may be using.

SUMMARY OF THE INVENTION

The present invention was made in light of the above limitations with conventional systems and methods as recognized by the present inventor. One aspect of the present invention, is a tether system that detects a relative distance from the pet to the bicycle, and if the relative motion for that particular distance indicates that the bicycle is quickly approaching the pet, automatically applies a braking system to slow the bicycle, thus averting injury to the pet.

One aspect of the system is that it detects a length to which the tether has been paid out, which approximates the radial distance of the pet to the bicycle. However, the system also monitors a rate at which the tether is paying-out or self-retracting to determine whether the risk is great for the bicycle to hit the pet, or the bicycle impart a severe tug on the pet.

Another feature is a mechanism that determines an azimuth position of the pet relative to the bicycle, such that the system is aware of the position of the pet in different zones about the bicycle. Moreover, the system tracks whether the pet is in front of the bicycle or next to it, and applies a different set of braking forces on the bicycle's brakes depending on which zone the pet is located at any given instant. Being able to determine the relative position of the pet to the bicycle, allows for the processor to apply a different set of rules for applying the brakes so as to protect the pet.

These and other features of the present invention will be more readily understood from the following detailed description and appended claims.

BRIEF SUMMARY OF THE DRAWINGS

FIG. 4 is a diagram showing a slide and rail used in determining which azimuthal zone the pet is located relative to the bicycle;

FIG. 5 is an alternative embodiment for a mechanism for determining pet position;

FIG. 6 is a diagram of an embodiment showing a detachable, portable version of PETS;

FIG. 10 is an exemplary data structure of a lookup table used for storing brake control data according to an embodiment of the present invention;

DETAILED DESCRIPTION OF EMBODIMENTS OF THE INVENTION

Figure 1:
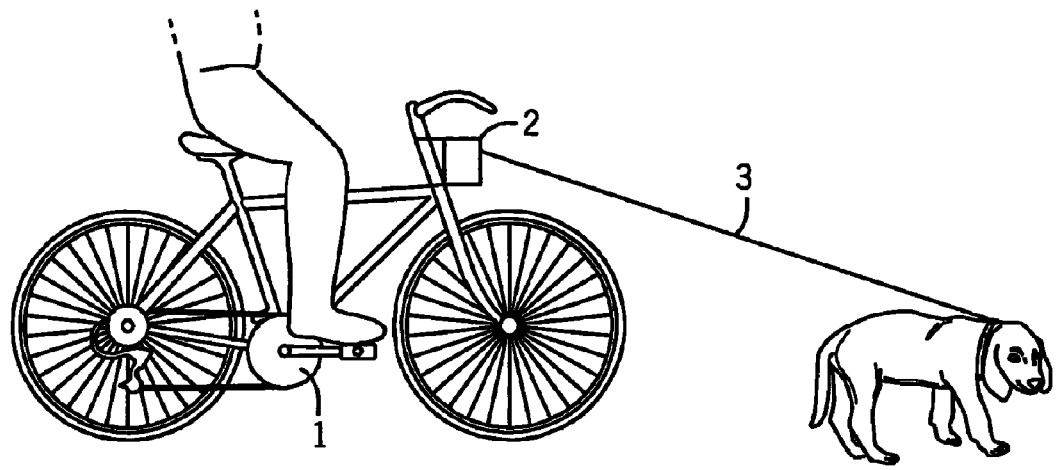
FIG. 1 illustrates a typical positional relationship between a bicycle, a tethered pet, and a puppy electronic tether system (PETS) according to the present invention.

FIG. 1 shows a bicycle 1 that includes at a front portion thereof a Puppy Electronic Tether System (PETS) 2. The PETS 2 uses a tether that attaches to dog's collar or harness. While the present embodiment describes use of PETS with respect to a dog, PETS is not so limited and may be used with other humans or animals that move along side a vehicle. In the present embodiments, the exemplary vehicle used to describe an operation of PETS is a bicycle, the invention is no so limited and may be equally valuable when used with a tricycle, motorized vehicle (such as a SEGWAY), or even in-line skates or other man-made devices employed by humans to ease translatory movement.

In normal operation, a person riding the bicycle tethers her dog to a PETS mounted on the bicycle so that the dog remains tethered to the bicycle during an exercise session. In many situations, the dog may wish to run in front of, or even pull, the bicycle and when doing so, a retractable spool in the PETS pays-out the tether so the dog may run further ahead of the bicycle. If however the dog slows down relative to the bicycle, PETS detects the dog's distance from the bicycle and the rate of change of speed of the dog relative to the bicycle. If the dog is in danger of being run over by the bicycle, PETS automatically applies the brakes on the bicycle by a predetermined amount, depending on the distance and rate of change of distance, and in some cases azimuthal position of the dog relative to the bicycle. Moreover, if the dog is slowly approaching the bicycle, there is not a sense of urgency and the bicyclist can maintain control of the bicycle without fear of running over the dog, and therefore PETS does not apply the brakes. However if the dog rapidly slows down, and the dog is detected as being in front of the bicycle, PETS applies the brakes to a first setting, so as to slow the rate that the bicycle approaches the dog. If the dog very rapidly slows down or even stops, PETS will apply a greater force to the brakes to reduce the risk of running over the dog.

Figure 2:
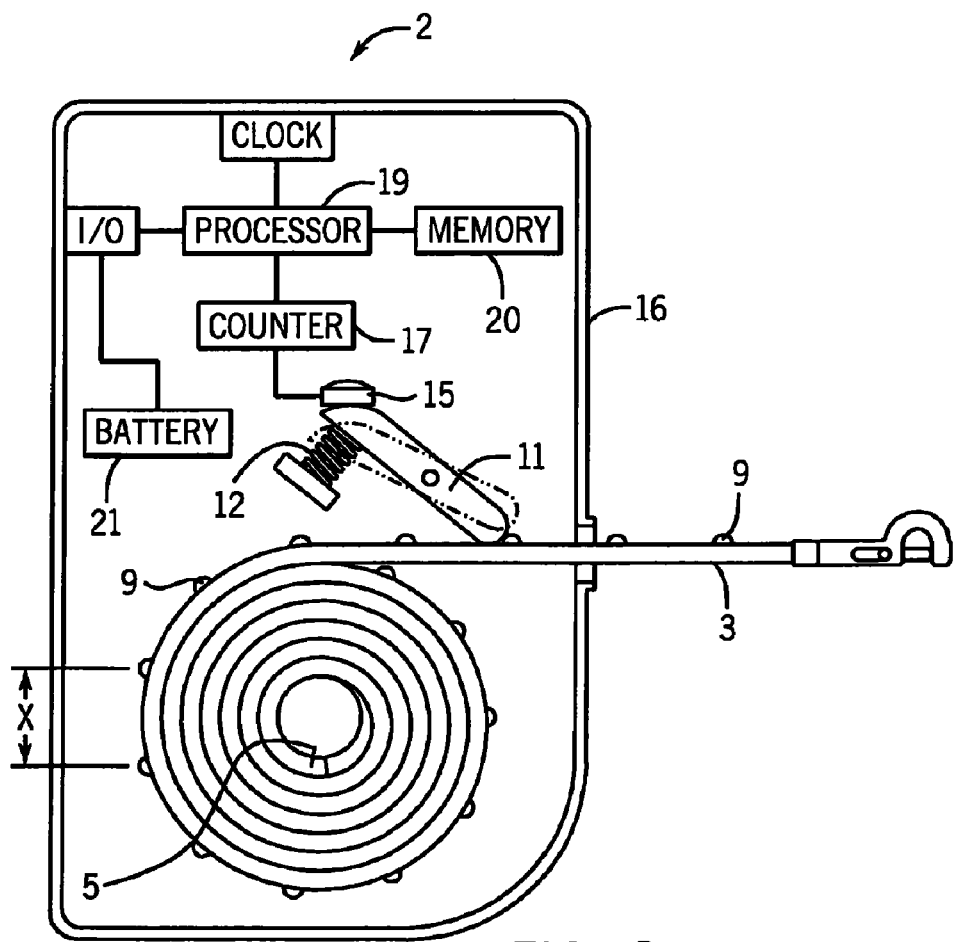
FIG. 2 is a diagram showing an electronic portion of the PETS, in cooperation with a tether and retractable spool according to the present invention.

FIG. 2 is an illustration of the present embodiment of PETS. A tether 3 is wound around a retractable spool 5, such that when the tether is fully retracted, the spool 5, which is biased to retract the tether when a pulling force is absent, has the tether wrapped around it fully. On the other hand, when the dog is attached to a free end of the tether 3 and the dog pulls on the tether, the retractable spool 5 pays out the tether 3 so that the dog may move away from the PETS 2. PETS 2 is contained in a housing 16 and the tether 3 pays in and out of an outlet. In the present embodiment the outlet may simply be an opening in the housing.

In other embodiments to be discussed later, the outlet rotates depending on a lateral force exerted by the dog.

The outlet is large enough to allow for counting indicators 9 to easily pass through the outlet. The counting indicators 9 are metallic bumps spaced apart on the substrate portion of the tether at a predetermined pitch X, such as one inch for example. While the present embodiment uses metallic bumps, other counting indicators may also be used, such as optical marks (dark spots or light spots for example), or depressions in the substrate. As an alternative to using counting indicators 9, the rotation of the hub on the retractable spool 5 may be monitored to determine the rate of rotation over a period of time to determine the amount by which the tether pays out. A processor keeps track of an amount that the tether is paid-out or released, and accounts for a rate of rotation variation to provide for a constant pay-out rate. Alternatively, an optical sensor located next to the hub observes an amount of tether is retained on the spool. By observing the amount of tether on the spool, the processor can readily determine the amount of tether that is deployed, thus providing an indication of how far the dog is from the bicycle.

In the present embodiment, the counting indicators 9 contact a biased contact arm 11 and when the metallic bumps move past the biased contact arm 11, the biased contact arm 11 makes contact with the counting indicator. The biased contact arm 11 contains a pivot, by which a resilient element 12 such as a spring, urges the biased contact arm 11 in an upward direction, in the present embodiment. The actuation and movement of the biased contact arm may operate in a variety of other manners consistent with the present teachings, such as being biased in a downward direction, sideways direction, or otherwise. As an alternative, the biased contact arm 11 may be replaced by an electrical probe that performs a resistance or capacitance check, either of which can be used to detect a presence of the metallic bumps as the metallic bumps pass across the biased contact arm. In either case, the number of counting indicators 9 that have passed by the electronic probe are constantly counted so as to determine the amount of pay out of the tether 3. Because the tether self-retracts as well, the counting is performed in a positive direction when paying out and a negative direction when retracting.

In the present embodiment, as the tether 3 pays out, or is retracted, the biased contact arm 11 makes contact at an opposite end with a contact 15, which in turn is connected to an electronic counter 17. Moreover, the contact 15 is metallic and allows for resistance or capacitance sensing so that each time the biased contact arm 11 makes contact with a counting indicator a cumulative count is incremented or decremented. In the present embodiment, the direction of count (positive or negative) is determined by the rotation direction of the hub on the retractable spool 5. Moreover, the rotation direction of the retractable spool 5 is detected by a detector (such as a torque meter) and an output from that detector is provided to the counter 17. Alternatively, a mechanical switch may be used to determine the mode. Moreover, the switch is in a first state when the tether moves against the switch's pole in one direction, but flips to the other state when the direction of tether movement changes. As an example, when the tether 3 is pulled by the dog, the spool will rotate in a clockwise direction, indicating to the counter 17 that the count should increase. On the other hand, when the tether 3 is retracting, the indicator on the retractable spool 5 sends a different signal to the counter 17 indicating to the counter 17 that the count should count in a negative direction. This way, the amount by which the tether 3 is paid-out or reeled-in, is accurately counted by the counter 17.

A processor 19 is connected to the counter 17, and keeps track of the cumulative count value, as well as the rate of change of the value held by the counter 17. In this way the processor 19 can determine the length of distance that the tether 3 is deployed, as well as the rate of change of the dog moving toward or away from the outlet in the PETS housing 16. The processor 19, as well as other electronics in the PETS 2, is provided with a battery 21 that may be either rechargeable, or actively powered by a generator on the bicycle wheel. A memory device 20 has stored therein a lookup table, that is referenced by the processor 19 to determine the amount of braking force to be applied to the brakes on the bicycle, depending on the distance that the tether's deployed distance, and the rate of change of the distance from the dog to the bicycle at any given instant.

Figure 3:
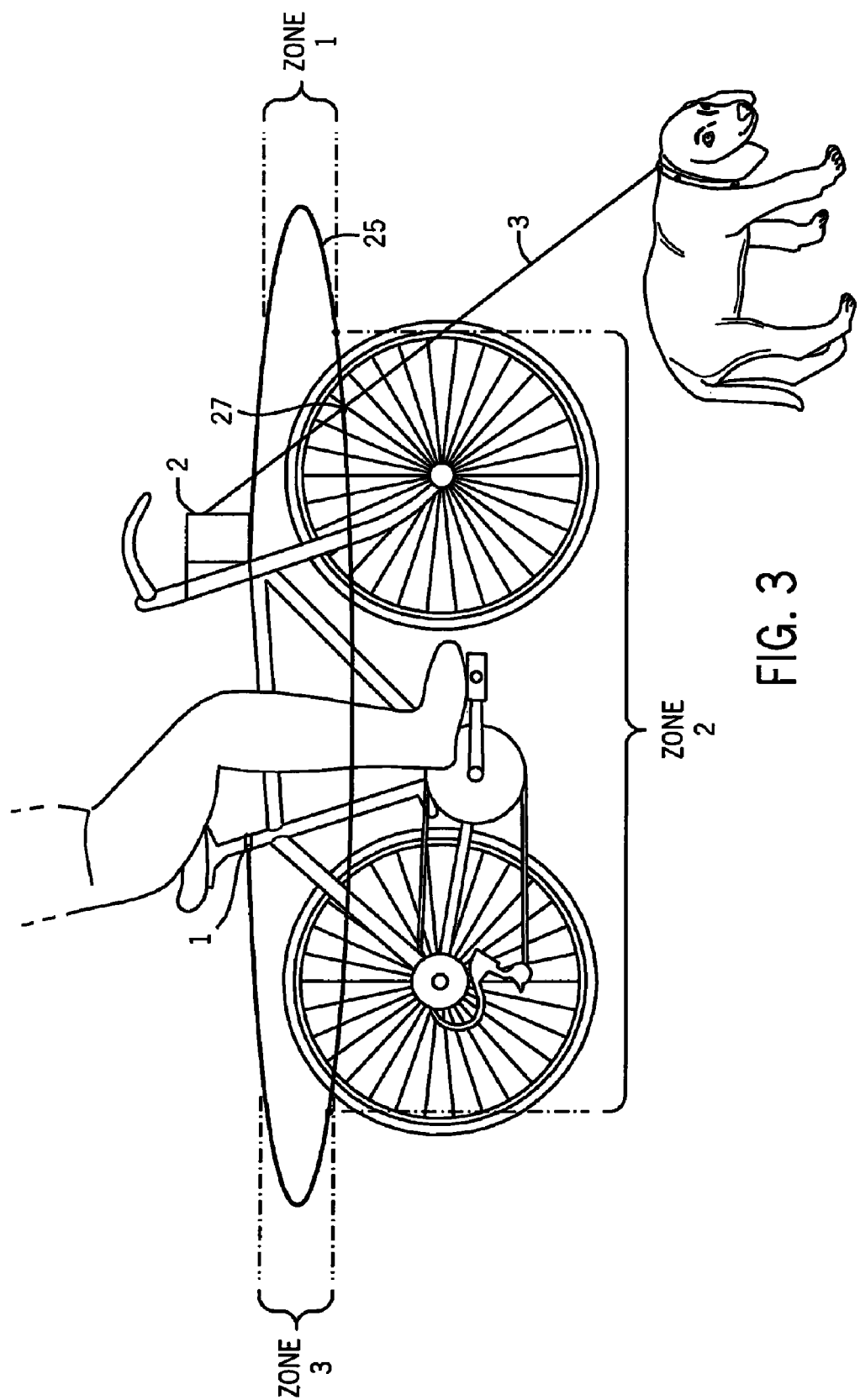
FIG. 3 shows another embodiment of PETS, which detects a pet position in multiple azimuthal zones.

FIG. 3 shows the bicycle 1 having the PETS 2 cooperate with a rail 25 mounted to the bicycle so as to provide another input to the PETS 2 regarding a position of the dog in one of several azimuthal zones around the bicycle. The processor 19 (FIG. 2), after consulting the appropriate stored value depending on the distance/rate of change conditions will apply different braking forces depending on the zone that the dog is located, relative to the bicycle. For example, as shown in FIG. 3, the zone 1 is an area in front of the bicycle, while zone 2 is an area on one side of the bicycle, while zone 3 is an area behind the bicycle. The rail 25 is conductive and mounted to the bicycle. The rail 25 permits a separate metallic slide 27 (see FIG. 4) to slide along the rail (into zone 1, 2, or 3) as urged by the dog's lateral force applied to the tether. The slide 27 is used to provide a location indication to the PETS 2 by permitting an observed difference in conductivity of the rail 25 in zones 1, 2 and 3. In particular, rail 25 is coated with materials having different conductivities in zones 1, 2 and 3. In particular, zone 1 will contain a coating on rail 25 that has a larger resistivity than that of zone 2, which in turn has a larger resistivity than that of zone 3. Thus when a small voltage source is applied to the rails, a current is passed through the rail 25 to the metallic slide 27 and through a conductive thread in the tether to the dog. The level of current depends on the resistivity of the region of the rail 25 on which the slide 27 is presently positioned. As an alternative to current flow, a voltage drop or measured resistance may also be used as an alternative to detect the position of the slide 27 in one of zones 1, 2 and 3. Furthermore, when a large breaking force is automatically applied by PETS 2 to the bicycle brakes, PETS 2 may optionally (under user control) also temporarily produce a larger temporary current that is sent to electrodes on the dog's collar as active feedback to the dog that his abrupt change in speed is not welcomed during the bike riding exercise. The level of current flow can optionally be set to correspond with the amount of braking force applied to the bicycle's brakes. A greater shock is given for a greater amount of braking force applied. As further active feedback, and audible alarm may also be sounded when the brakes are automatically applied. The tone or audible power level may be set to distinct values, to match the amount of force being applied to the brakes. The audible alarm may be applied a predetermined amount before the shock stimulus is applied to the dog, so the dog has the opportunity to react to the audible alarm before being shocked. However, if the dog does not promptly alter his behavior once the alarm is given, the dog will subsequently receive negative feedback in the form of an electric shock.

As shown in FIGS. 4 and 5, the rail may either be a single unit or differential rail 26. In the case of a double rail, a differential slide 28 would have a function of detecting a current flow between the first rail and the second rail where a voltage source 29 is applied at one end of each of the rails. Depending on the position of the differential slide 28 on the differential rail 26, a position of the pet in one of zones 1, 2 or 3 may be detected by observing the voltage drop between the differential rail 26 or by directly measuring current or differential resistance between the two rails.

FIG. 6 shows an alternative embodiment where the PETS 2 has a housing 16 that is made to be portable. The housing 16 has a handle 100 that the user may hold when detaching the PETS 2 from the bicycle. Moreover, the PETS 2 connects at a connector 101 to a clip 103 which in turn connects the metallic cable 37 to battery 21 (FIG. 2). The battery 1 provides power via the metallic cable in the PETS 2 for recharging the portable battery contained in the PETS 2. A mode switch 116 is user selectable to select between a mounted mode of operation and a walking mode of operation. In the walking mode of operation the electronics are turned off such that there is no need to monitor the position of the dog relative to the bicycle since the PETS 2 has been detached from the bicycle.

Figure 7:
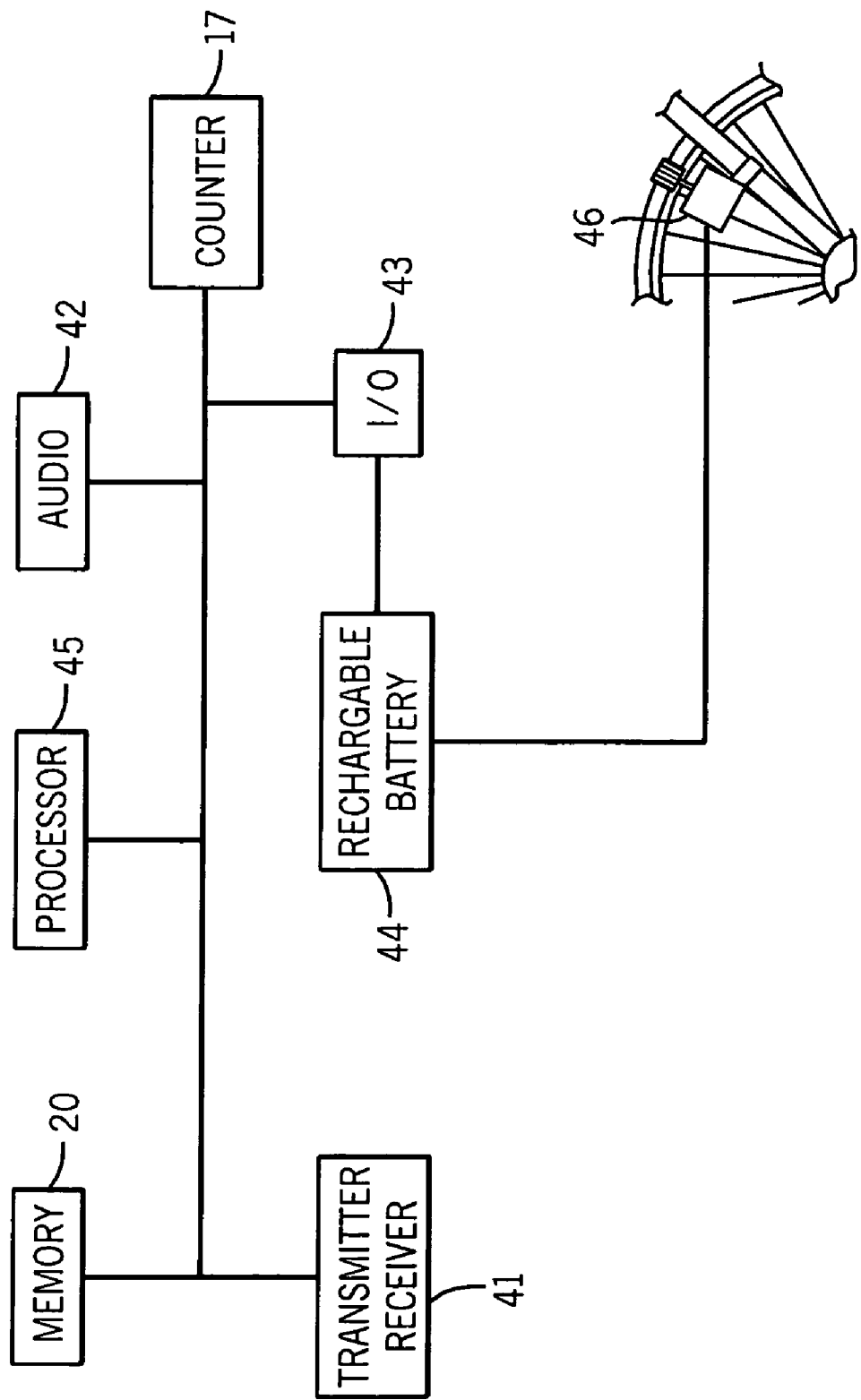
FIG. 7 is a schematic diagram of an electronics portion of components used in an embodiments of PETS.

FIG. 7 is a block diagram of an electronics portion contained in the PETS 2 with a rechargeable battery 44 and geared coupler/transducer/speed sensor 46 which couples to one of the wheels on the bicycle. In particular, the geared coupler/generator/speed sensor 46 is detachably contacted to the wheel such that the motion of the wheel imparts a force on the geared coupler/generator/speed sensor 46 so as to produce an electrical current which is in turn provided to the rechargeable battery 44. The rotation rate of the wheel is directly imparted to the geared coupler/generator/speed sensor 46 so the speed of the bicycle may be determined. Processor 45 connects via a bus to the counter 17, previously discussed with respect to FIG. 2. CPU 45 retrieves values from the lookup table regarding zone values in the flash memory 20. Thus, depending on the detected position of the dog as determined via the rails in FIGS. 3-5, the lookup table provides the processor 45 with information regarding the braking force that the processor should apply to the brake mechanisms on the bicycle. A wireless transmitter receiver 41 also connects to the bus 4 both providing information regarding the present state of the PETS 2 including data such as distance from bicycle (tether length paid out) and relative speed between the end of the tether and the PETS 2. The transmitter/receiver 41 can transmit this information to a remote device that in turn may monitor the braking operation such that a wireless signal may be sent to the brake mechanism (discussed below with regard to FIG. 8). The wireless feature is particularly suitable for use with a PETS system used with inline skates having a controllable breaking system. External input such as a wireless counter 17 may transmit via Bluetooth or other short range wireless communication system to the transmitter/receiver 41 for providing data regarding the count value at any given instant to the CPU 45.

An audio alarm 42 is provided to provide an audible alert (discussed above) should the brakes be applied automatically by the processor 45. This audible alarm would alert the user and dog that the brakes are automatically being applied. The audible alarm may also be used to help train the dog to avoid the erratic behavior that caused the alarm. In the training mode of operation, an electrical current may be passed through a conductive element in the tether to have an electrical shocking sensation to the dog, thus reinforcing the notion that the dog should avoid such erratic behavior in the future.

Figure 8:
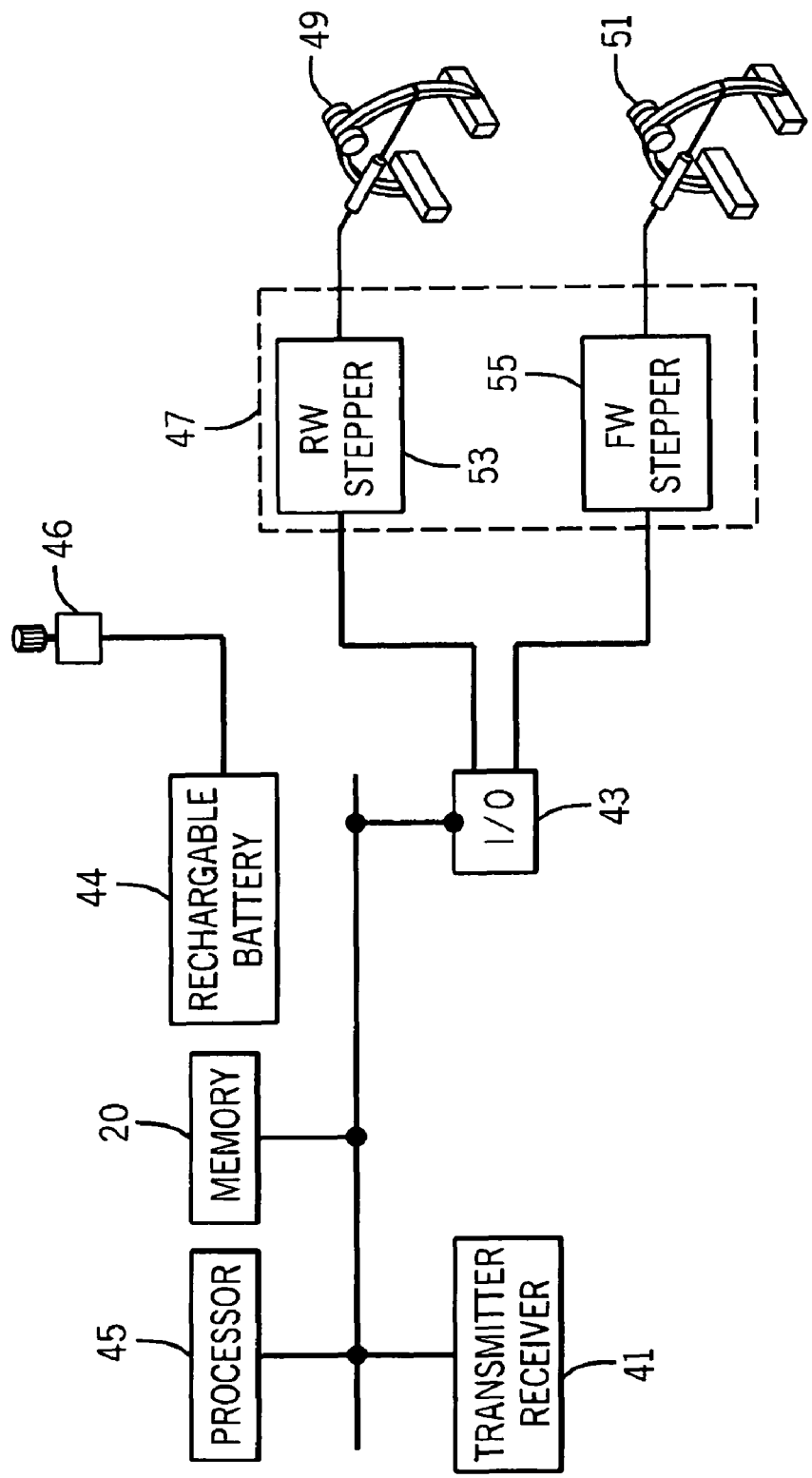
FIG. 8 is a block diagram of an electronics portion for an automatically controlled vehicle braking mechanism according to the present invention.

FIG. 8 is a block diagram of the electronics contained on the braking portion of the bicycle system. Motor housing 47 contains a rear wheel stepper motor 53 that drives a brake caliper for the rear wheel 49. Likewise a front wheel stepper motor 55 provides the torque for opening or closing the front wheel brake caliper 51 depending on signals sent from the processor 45. In operation, if the processor 45 determines that the brakes are to be applied by a first level, signals are sent to the rear wheel stepper motor 53 and front wheel stepper motor 55, which drives the stepper motors by a predetermined amount thus causing the brake calipers to apply a predetermined force to the rear wheels and front wheels respectively. The stepper motors 53 and 55 may either receive the signals directly via a bus or through IO 43, or even wirelessly by the transmitter/receiver 41. Memory 20 provides the lookup table values for the processor 45 regarding the amount of steps that should be applied to the respective stepper motors to achieve the desired braking force. Power is provided by the rechargeable battery 44 which may be recharged by the geared coupler/generator/speed sensor 46 or from an AC/DC converter.

Figure 9:
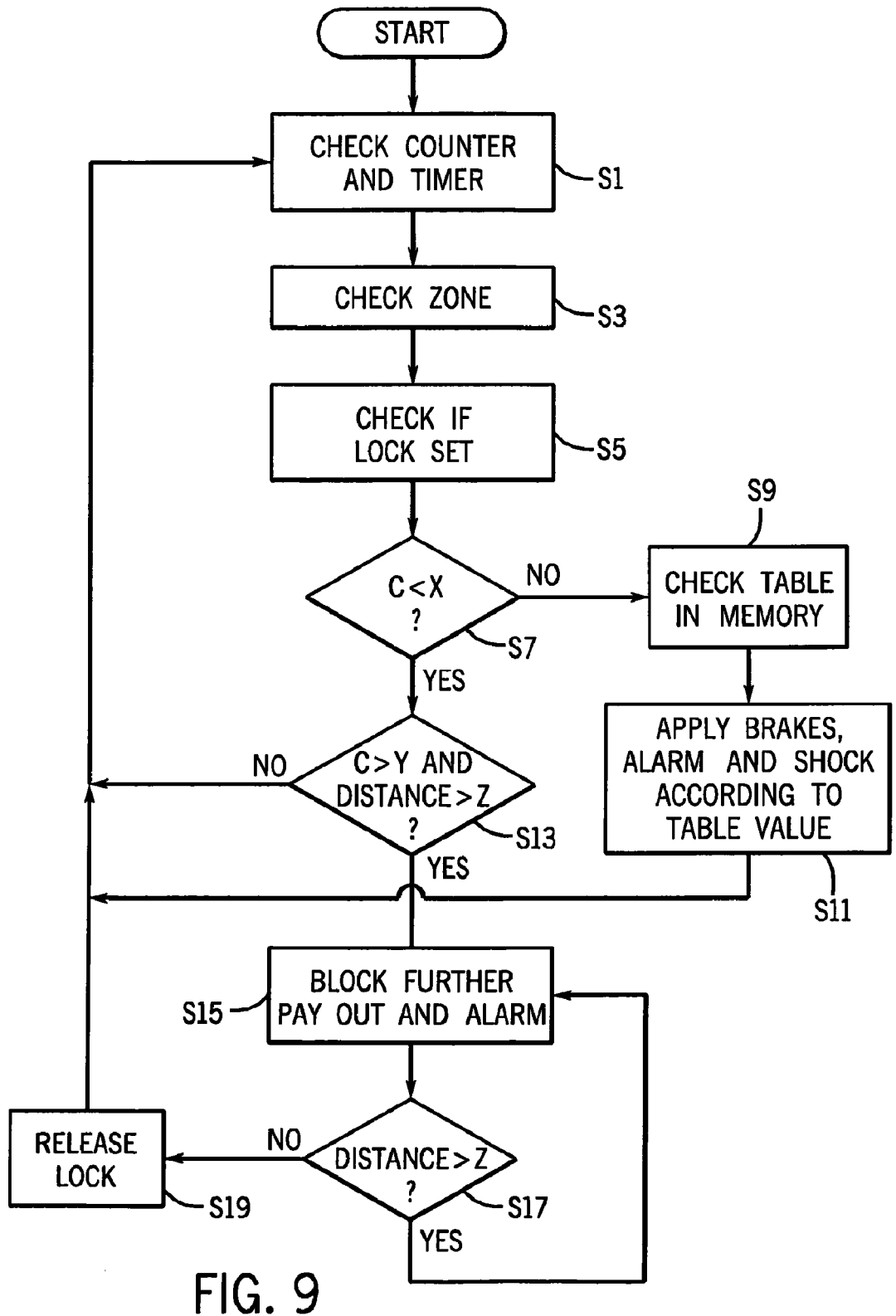
FIG. 9 is a flowchart showing a process flow according to an embodiment of the present invention.

FIG. 9 is a flowchart for a method performed according to the present invention. The process is controlled by a processor which begins in step S1 with checking a value of the counter. The process then proceeds to step S3 where the value of the azimuthal zone (zone 1, zone 2 or zone 3) is checked. The process also checks whether or not a lock is set with regard to avoiding having the tether pay out, which may be undesirable in certain situations, such as near a roadside. The process then proceeds to step S7 where the processor makes an inquiry whether the count value "c" is less than a predetermined value X. Once again the count value corresponds to a distance from the PETS to the pet. If the response to the inquiry in step S7 is negative, the process proceeds to set S9 where the value of the lookup table for that particular count value is checked and a signal is sent in step S11 to the apply the brakes and sound the audible alarm according to the value of the lookup table that corresponds with the distance. However if the response to the inquiry in step S7 is affirmative, the process proceeds to step S13 where another comparison is made regarding the count value being above a predetermined amount Y. Also the rate of change is checked. If the response is negative, the process returns to step S1. However if the response is affirmative, the PETS 2 blocks further pay out of the tether 3 in step S15 and sounds an alarm. The process then proceeds to step S17 where the distance is checked to be above a certain predetermined amount Z. If that distance is greater than the predetermined amount, the process returns to step S15 where the pay out is blocked. However if the distance is not greater than the amount Z, the process then proceeds to step S19 where the lock on the pay out is released and then the process returns to step S1.

FIG. 10 is an exemplary data structure for a lookup table, which is broken into three different zones. In zone 1, if it is determined that the pay out rate is in a positive direction and the distance is between 0 and 5 feet, then an indication is given that either the lock mechanism is applied or the brakes are applied by a certain amount. The lookup table in FIG. 10 is populated with values according to the charts shown in FIGS. 11, 12 and 13.

Figure 11:
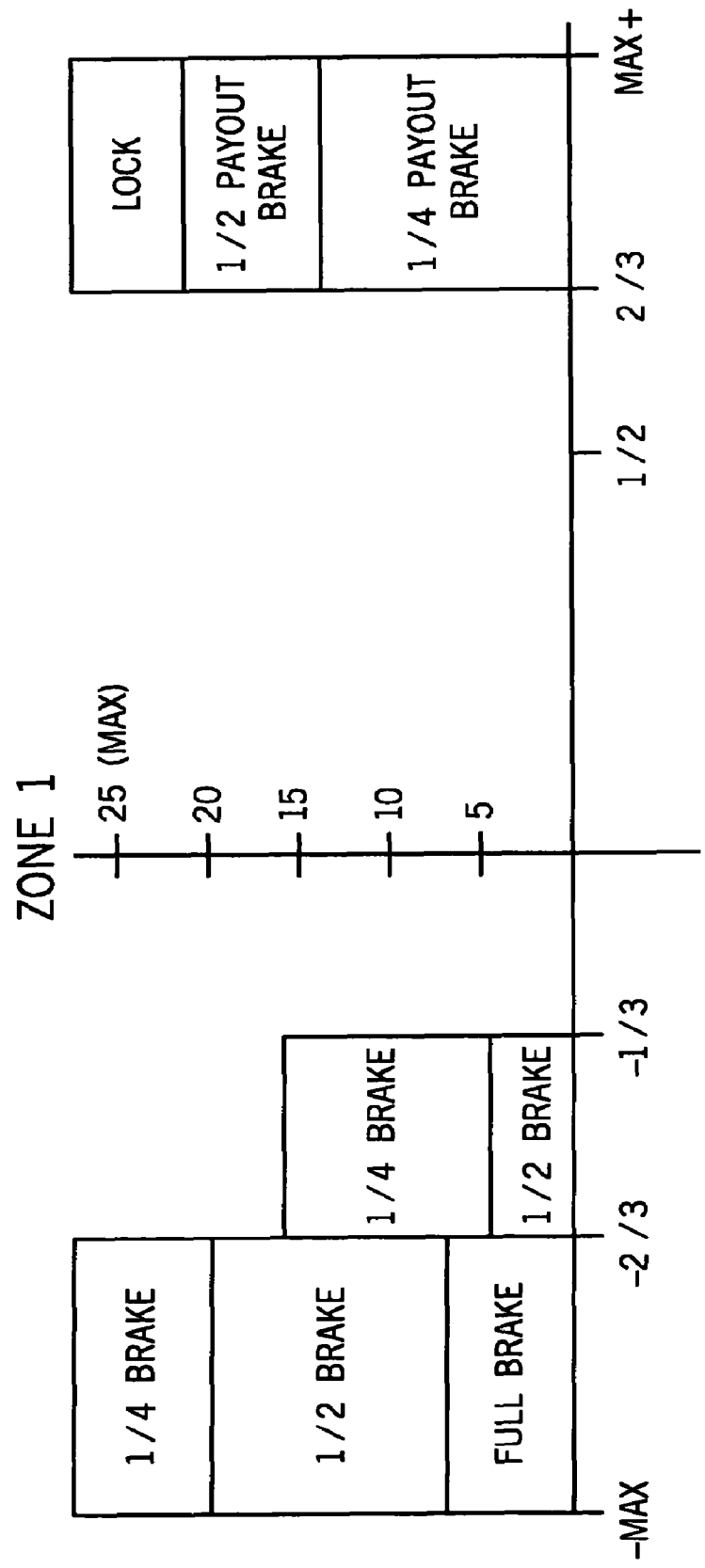
FIG. 11 is a distance/rate diagram showing how brake control data is differentiated in a memory look up table for braking forces automatically applied for the pet being a given distance from the bicycle and observed payout/retract rate.

As shown in FIG. 11, if the pay out rate is at a maximum amount in the negative direction (meaning that the dog is quickly moving towards the bicycle when the dog is in zone 1, and the distance is a short distance such as 5 feet or less, then the processor indicates that a full braking force is to be applied. (A corresponding audible alarm and shocking current are optional produced as well). However if the dog's distance is farther such as between 5 feet and 15 feet, the brakes are applied at half power. If the dog is at a farther distance such as between 15 feet and the maximum distance of the tether of 25 feet, the brakes are applied at a quarter power. The amount of braking force is controlled by a number of pulses set to front or real wheel stepper motors, which in turn convert the motor's motion into a pitching the brake calipers.

If the pay out rate in the negative direction is between two-thirds and one-third, and the distance from the bicycle is between 0 feet and 5 feet, than the brakes are applied at half power. The brakes are applied at a quarter power if in the same region but the dog is at a farther distance such as the beyond 5 feet relative to the bicycle. In this case, the brakes are applied at quarter power. On the other hand, while the dog is in zone 1, and the pay out rate is in the positive direction, a braking force is applied to the retractable spool when the pay out rate is between two-thirds and maximum pay out rate and the dog is between 0 feet and 15 feet from the bicycle. In this case, greater tension is placed on the dog as the dog pulls on the PETS 2. A greater braking force is applied to the retractable spool when the dog is farther from the bicycle as shown. At the maximum distance a lock is placed to avoid the dog moving any farther from the bicycle or damaging the retractable spool.

Figure 12:
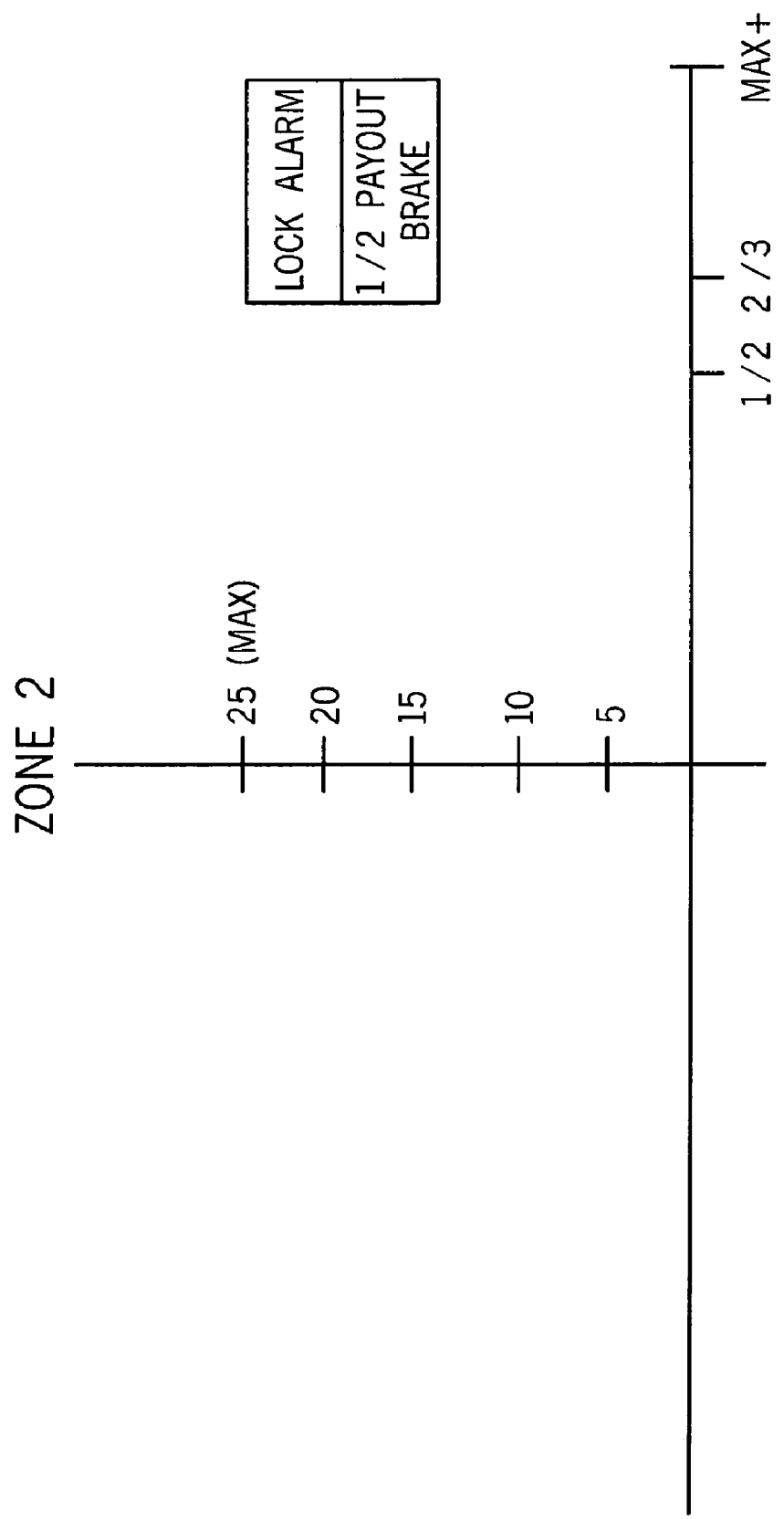
FIG. 12 is a diagram similar to FIG. 11, but for when the pet is next to the bicycle, not in front of the bicycle.

FIG. 12 shows a different arrangement, where the dog is positioned next to the bicycle, and presumably will not run directly into the bicycle. Therefore, when the dog is in zone 2 and the dog is running at full charge towards the bicycle, only then will the brakes be applied for a short distance as shown. Likewise, the pay out rate for the tether is applied at half power when the pay out rate is at a maximum rate, and the dog is about 15 feet or greater from the bicycle. This will help avoid the bicycle becoming unstable when the dog pulls strongly on the bicycle. PETS 2 operates on the principle that when the dog is in zone 2, both the dog and the bicyclist are in a more safe position than when the dog is in zone 1.

Figure 13:
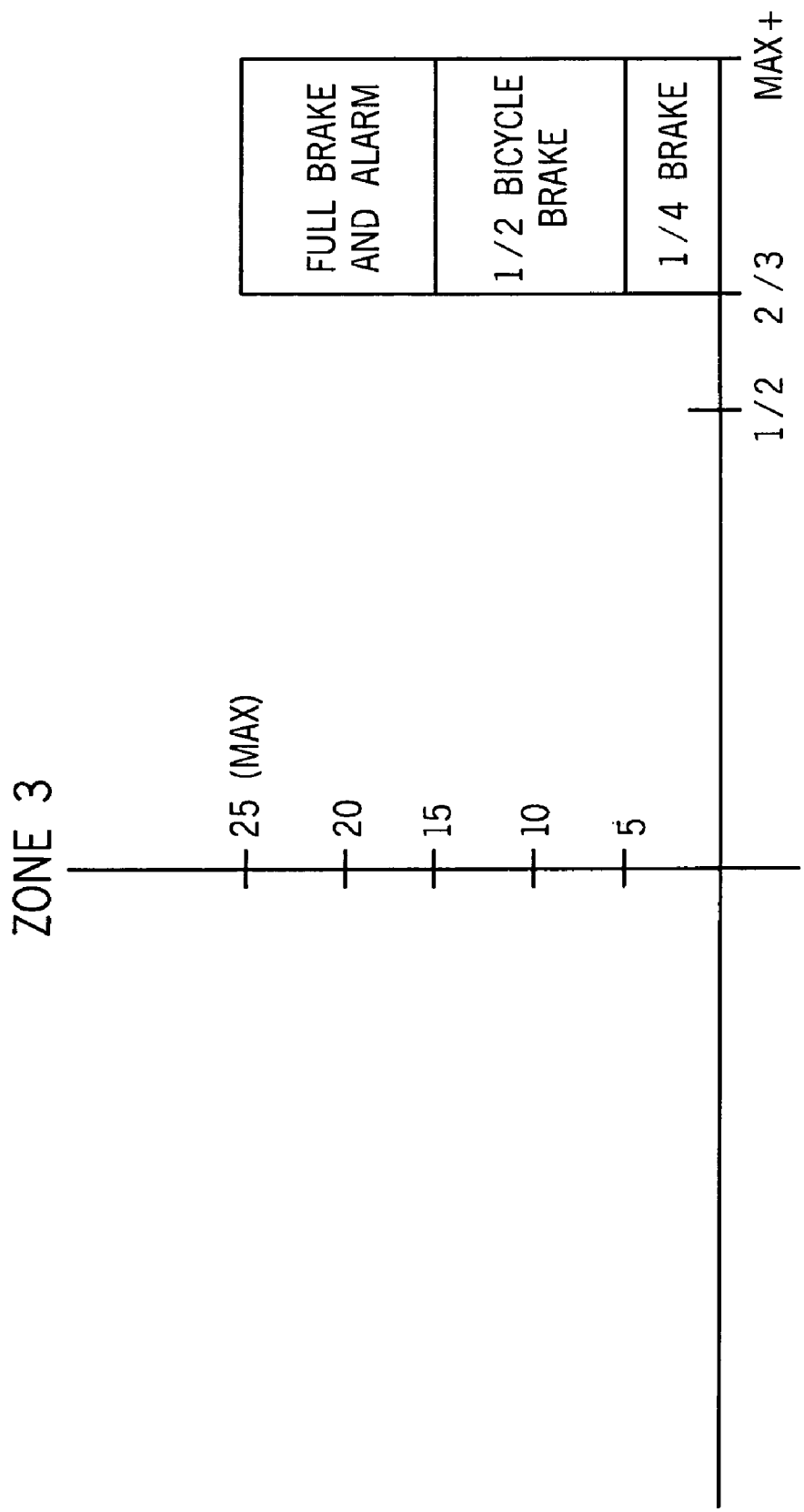
FIG. 13 is another diagram similar to FIGS. 11 and 12 but used when the pet is detected to be behind the bicycle.

FIG. 13 includes another chart having values for braking associated with the dog being behind the bicycle. In this case, there is really no risk that the dog will run into the bicycle, the only risk is that the bicycle may violently yank on the dog if the dog chooses to stop. This would materialize when the PETS detects that the pay out rate is at a maximum in the positive direction, and the distance from the bicycle to the dog is at a maximum rate. In this case, an alarm is sounded and the braking force is applied fully. When the dog is closer to the bicycle, the brakes are applied at half power or quarter power, depending on how far the dog is from the bicycle.

Figure 14:
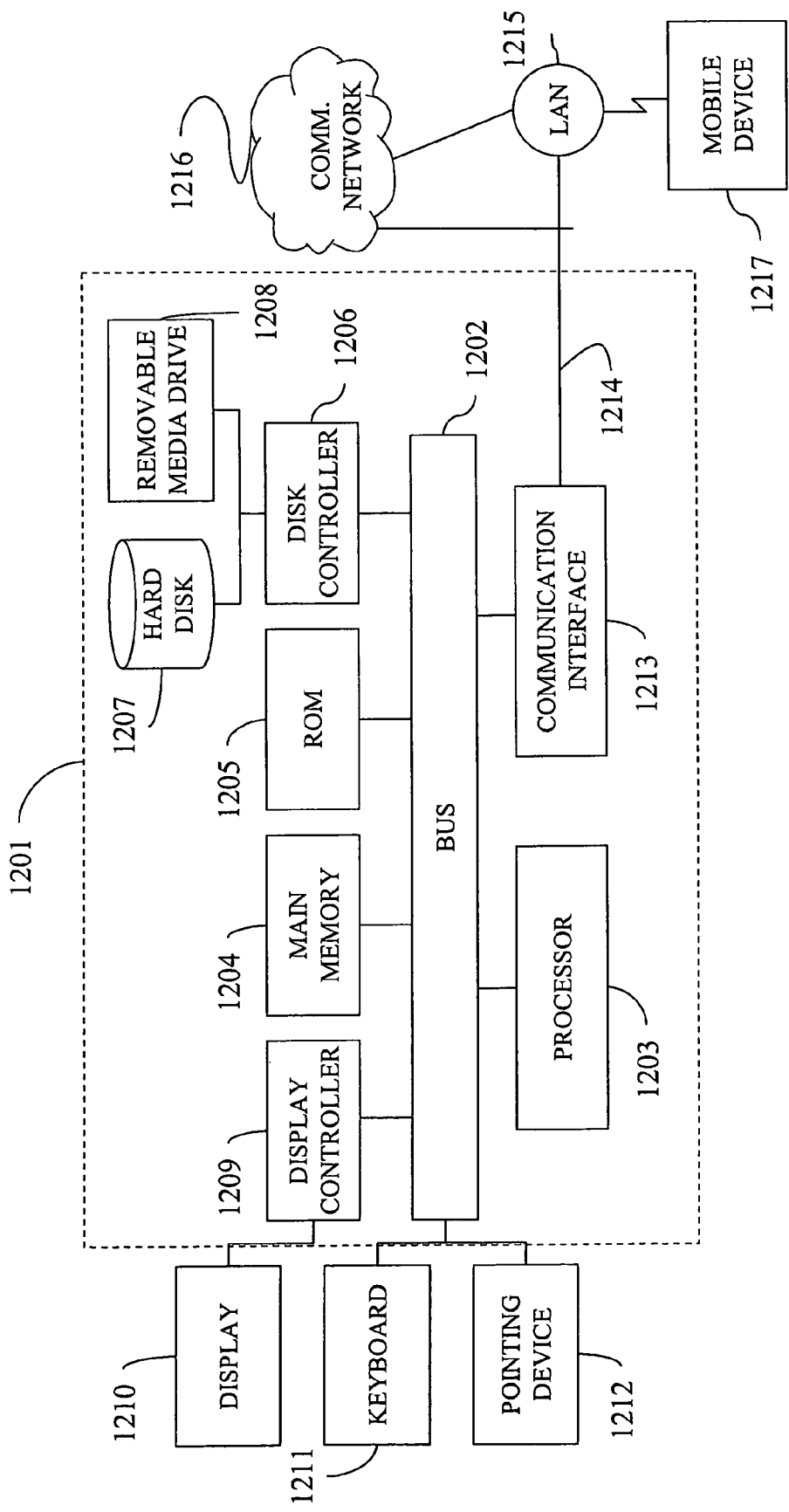
FIG. 14 is a block diagram of an embodiment of an electronics portion used for controlling the system according to the present invention.

FIG. 14 illustrates a computer system 1201 upon which an embodiment of the present invention may be implemented. The computer system 1201 includes a bus 1202 or other communication mechanism for communicating information, and a processor 1203 coupled with the bus 1202 for processing the information. The computer system 1201 also includes a main memory 1204, such as a random access memory (RAM) or other dynamic storage device (e.g., dynamic RAM (DRAM), static RAM (SRAM), and synchronous DRAM (SDRAM)), coupled to the bus 1202 for storing information and instructions to be executed by processor 1203. In addition, the main memory 1204 may be used for storing temporary variables or other intermediate information during the execution of instructions by the processor 1203. The computer system 1201 further includes a read only memory (ROM) 1205 or other static storage device (e.g., programmable ROM (PROM), erasable PROM (EPROM), and electrically erasable PROM (EEPROM)) coupled to the bus 1202 for storing static information and instructions for the processor 1203.

The computer system 1201 also includes a disk controller 1206 coupled to the bus 1202 to control one or more storage devices for storing information and instructions, such as a magnetic hard disk 1207, and a removable media drive 1208 (e.g., floppy disk drive, read-only compact disc drive, read/write compact disc drive, compact disc jukebox, tape drive, and removable magneto-optical drive). Not all of these devices are needed, or even helpful when PETS is deployed on a bicycle. However, they may be helpful when adjusting storage values, which is a way for adapting PETS 2 for a particular user. The storage devices may be added to the computer system 1201 using an appropriate device interface (e.g., small computer system interface (SCSI), integrated device electronics (IDE), enhanced-IDE (E-IDE), direct memory access (DMA), or ultra-DMA).

The computer system 1201 may also include special purpose logic devices (e.g., application specific integrated circuits (ASICs)) or configurable logic devices (e.g., simple programmable logic devices (SPLDs), complex programmable logic devices (CPLDs), and field programmable gate arrays (FPGAs)).

The computer system 1201 may also include a display controller 1209 coupled to the bus 1202 to control a display 1210, such as a cathode ray tube (CRT) or liquid crystal display (LCD), for displaying information to a computer user. The computer system includes input devices, such as a keyboard 1211 and a pointing device 1212, for interacting with a computer user and providing information to the processor 1203. The pointing device 1212, for example, may be a mouse, a trackball, a finger for a touch screen sensor, or a pointing stick for communicating direction information and command selections to the processor 1203 and for controlling cursor movement on the display 1210. In addition, a printer may provide printed listings of data stored and/or generated by the computer system 1201.

The computer system 1201 performs a portion or all of the processing steps of the invention in response to the processor 1203 executing one or more sequences of one or more instructions contained in a memory, such as the main memory 1204. Such instructions may be read into the main memory 1204 from another computer readable medium, such as a hard disk 1207 or a removable media drive 1208. One or more processors in a multi-processing arrangement may also be employed to execute the sequences of instructions contained in main memory 1204. In alternative embodiments, hard-wired circuitry may be used in place of or in combination with software instructions. Thus, embodiments are not limited to any specific combination of hardware circuitry and software.

As stated above, the computer system 1201 includes at least one computer readable medium or memory for holding instructions programmed according to the teachings of the invention and for containing data structures, tables, records, or other data described herein. Examples of computer readable media are compact discs, hard disks, floppy disks, tape, magneto-optical disks, PROMs (EPROM, EEPROM, flash EPROM), DRAM, SRAM, SDRAM, or any other magnetic medium, compact discs (e.g., CD-ROM), or any other optical medium, punch cards, paper tape, or other physical medium with patterns of holes, a carrier wave (described below), or any other medium from which a computer can read.

Stored on any one or on a combination of computer readable media, the present invention includes software for controlling the computer system 1201, for driving a device or devices for implementing the invention, and for enabling the computer system 1201 to interact with a human user (e.g., print production personnel). Such software may include, but is not limited to, device drivers, operating systems, development tools, and applications software. Such computer readable media further includes the computer program product of the present invention for performing all or a portion (if processing is distributed) of the processing performed in implementing the invention.

The computer code devices of the present invention may be any interpretable or executable code mechanism, including but not limited to scripts, interpretable programs, dynamic link libraries (DLLs), Java classes, and complete executable programs. Moreover, parts of the processing of the present invention may be distributed for better performance, reliability, and/or cost.

The term "computer readable medium" as used herein refers to any medium that participates in providing instructions to the processor 1203 for execution. A computer readable medium may take many forms, including but not limited to, non-volatile media, volatile media, and transmission media. Non-volatile media includes, for example, optical, magnetic disks, and magneto-optical disks, such as the hard disk 1207 or the removable media drive 1208. Volatile media includes dynamic memory, such as the main memory 1204.

Various forms of computer readable media may be involved in carrying out one or more sequences of one or more instructions to processor 1203 for execution. For example, the instructions may initially be carried on a magnetic disk of a remote computer. The remote computer can load the instructions for implementing all or a portion of the present invention remotely into a dynamic memory and send the instructions over a telephone line using a modem. A modem local to the computer system 1201 may receive the data on the telephone line and use an infrared transmitter to convert the data to an infrared signal. An infrared detector coupled to the bus 1202 can receive the data carried in the infrared signal and place the data on the bus 1202. The bus 1202 carries the data to the main memory 1204, from which the processor 1203 retrieves and executes the instructions. The instructions received by the main memory 1204 may optionally be stored on storage device 1207 or 1208 either before or after execution by processor 1203.

The computer system 1201 also includes a communication interface 1213 coupled to the bus 1202. The communication interface 1213 provides a two-way data communication coupling to a network link 1214 that is connected to, for example, a local area network (LAN) 1215, or to another communications network 1216 such as the Internet. For example, the communication interface 1213 may be a network interface card to attach to any packet switched LAN. As another example, the communication interface 1213 may be an asymmetrical digital subscriber line (ADSL) card, an integrated services digital network (ISDN) card or a modem to provide a data communication connection to a corresponding type of communications line. Wireless links may also be implemented. In any such implementation, the communication interface 1213 sends and receives electrical, electromagnetic or optical signals that carry digital data streams representing various types of information.

Figure 15:
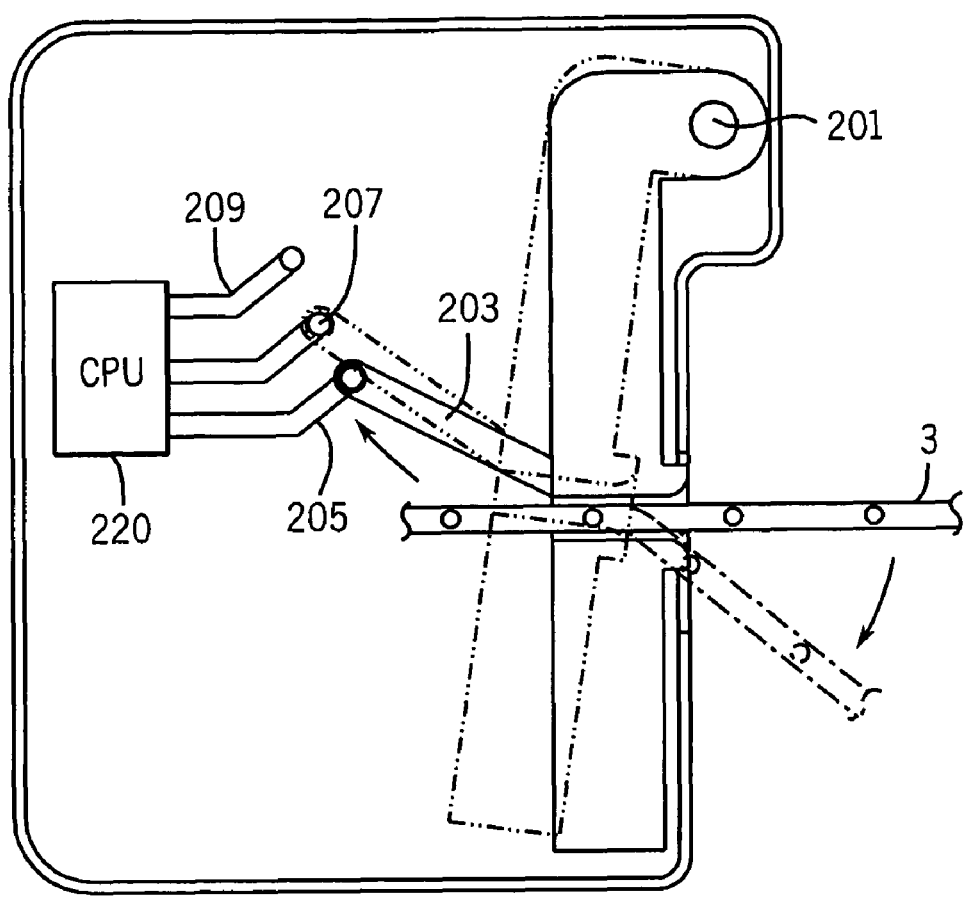
FIG. 15 is a schematic diagram of an embodiment that employs a hinged outlet with multiple contacts for detecting an azimuthal position of a tethered pet relative to a spool outlet.

The network link 1214 typically provides data communication through one or more networks to other data devices. For example, the network link 1214 may provide a connection to another computer through a local network 1215 (e.g., a LAN) or through equipment operated by a service provider, which provides communication services through a communications network 1216. The local network 1214 and the communications network 1216 use, for example, electrical, electromagnetic, or optical signals that carry digital data streams, and the associated physical layer (e.g., CAT 5 cable, coaxial cable, optical fiber, etc). The signals through the various networks and the signals on the network link 1214 and through the communication interface 1213, which carry the digital data to and from the computer system 1201 maybe implemented in baseband signals, or carrier wave based signals. The baseband signals convey the digital data as unmodulated electrical pulses that are descriptive of a stream of digital data bits, where the term "bits" is to be construed broadly to mean symbol, where each symbol conveys at least one or more information bits. The digital data may also be used to modulate a carrier wave, such as with amplitude, phase and/or frequency shift keyed signals that are propagated over a conductive media, or transmitted as electromagnetic waves through a propagation medium. Thus, the digital data may be sent as unmodulated baseband data through a "wired" communication channel and/or sent within a predetermined frequency band, different than baseband, by modulating a carrier wave. The computer system 1201 can transmit and receive data, including program code, through the network(s) 1215 and 1216, the network link 1214 and the communication interface 1213. Moreover, the network link 1214 may provide a connection through a LAN 1215 to a mobile device 1217 such as a personal digital assistant (PDA) laptop computer, or cellular telephone FIG. 15 shown an alternative embodiment to that described in FIGS. 4 and 5 for detecting an azimuthal position of the dog in a predetermined number of zones, from 2 to 10. The embodiment shown includes a hinged outlet 201 that pivots about a vertical axis when moved by a lateral force imparted by the tether 3 when the dog moves azimuthally about the bicycle in different zones. When the tether 3 is urged in a clockwise direction by the dog moving in a clockwise direction relative to the bicycle, a pole 203 breaks contact with a zone 1 contact 205, and rotates to a position where it makes physical contact with a zone 2 contact 207. If the dog moves further in a clockwise direction, such as behind the bicycle, the dog will be positioned in zone 3, and the movement by the dog will cause the pole to make contact with the zone 3 contact 209. Each of the contacts permit electronic sensing by a processor (CPU) 220, or other detector, so as to provide a signal on separate signal lines (or alternative different, distinguishable signals, on a common line) so as to provide a mechanism and method for detecting the azimuthal position of the dog relative to the bicycle. For simplicity only three zones are shown on one side of the bicycle. However, the hinged outlet could also pivot over a greater range such that the azimuthal position of the dog may be detected on the other side of the bicycle as well to provide full coverage over 360 degrees.

While three zones are shown, 2, 3, 4, 5, 6, 7, 8, 9 or 10 zones, for example, may be employed, but this is merely illustrative, and a greater number of zones may be uses, depending on the azimuthal resolution desired. Furthermore, the size (surface contact area) and spacing of the different zone contacts may be varied according to the relative size of each zone. For example, zone 1 may cover only a 30 degree range, but zone 2 is made to cover 120 degrees, and zone 3, 30 degrees. In an exemplary embodiment, the zones may be made to vary from 10 degrees to 180 degrees.

The hinged outlet could also have the hinge pin oriented vertically, such that the outlet moves in a horizontal direction, much like the motion of a rotating lawn sprinkler.

The above described embodiments of the invention are meant to illustrative and not an exhaustive description of all possible variants of the present invention. As such, it should be understood that the present invention covers options, variations, and combinations of features described herein and others as would be understood based on the present teachings by one of ordinary skill in the art.

The invention claimed is:

1. A vehicle-mountable tethering mechanism with automatic vehicle braking control features comprising:
   a retractable spool mountable to a vehicle and having a tether that pays out when a pulling force is applied to the tether, and retracts when the pulling force is removed;
   the tether that includes a plurality of counting indications disposed at predetermined positions on the tether, said tether having a free end configured to detachably attach to a dog collar or dog harness;
   a counter that counts the counting indicators as the counting indicators pass by the counter when the tether is paying out or retracting;
   a rate of change detector that determines rate of change of the tether as a pay out rate or retraction rate of the end portion of the tether relative to a moving vehicle, a time period between counting indicators passing by the counter being indicative of a rate of change;
   an electrical power source;
   a brake actuator configured to actuate brakes on the vehicle to controllable slow the vehicle by predetermined amount;
   a computer readable storage device that has stored therein braking levels that correspond with and a tether deployment amount and rate of change; and
   a processor configured to retrieve from the storage device a braking level corresponding to the tether deployment amount and the rate of change, and control the breaking actuator to apply the breaking level to the brakes if the determined tether deployment is less than a predetermined amount and the rate of change is greater than a predetermined amount.

2. The vehicle-mountable tethering mechanism according to claim 1, further comprising:
   a zone detector that detects a positional zone in which the dog is located relative to the bicycle, said positional zone being one of a plurality of zones, and wherein
   the processor retrieves a different braking level depending on the positional zone detected by the zone detector.

3. The vehicle-mountable tethering mechanism according to claim 2, further comprising:
   an audible alarm; and
   a electrical stimulus device, wherein
   when the processor determines that dog is located in a predetermined zone and the tether deployment amount and rate of change are within a predetermined range, the audible alarm produces a noise and the stimulus devices applies an electrical stimulus to the dog as a warning.

4. The vehicle-mountable tethering mechanism according to claim 3, wherein,
   the audible alarm is activated a predetermined amount of time prior to the electrical stimulus device generating the electrical stimulus so as to provide the dog with an amount of time to take corrective action before receiving the electrical stimulus.

5. The vehicle-mountable tethering mechanism according to claim 3, wherein
   the audible alarm produces a plurality of sounds, each of the plurality of sounds corresponding to a different braking level.

6. The vehicle-mountable tethering mechanism according to claim 2, wherein:
   the zone detector includes
      a hinged outlet that rotates to follows a motion of a dog from zone to zone, and
      a pole that makes contact with respective of a plurality of contacts to detect one of the plurality of zones depending on the rotational position of the hinged outlet.

7. The vehicle-mountable tethering mechanism according to claim 1, wherein the vehicle is a bicycle.

8. The vehicle-mountable tethering mechanism according to claim 1, wherein:
   the vehicle is an in-line skate.

9. The vehicle-mountable tethering mechanism according to claim 8, wherein:
   the brake actuator includes a plunger mechanism that applies a stopping force to a brake on the in-line skate.

10. The vehicle-mountable tethering mechanism according to claim 1, wherein the computer readable storage device stores respective a common breaking level for a tether deployment amount in a first range, and a rate of change in a second range.

11. The vehicle-mountable tethering mechanism according to claim 1, wherein the retractable spool includes a payout break that increases a resistance for paying out the tether as a function of payout breaking force for applied to the payout break.

12. The vehicle-mountable tethering mechanism according to claim 11, further comprising:
a zone detector that detects a positional zone in which the dog is located relative to the bicycle, said positional zone being one of a plurality of zones, and wherein
the processor retrieves a different payout force amount to be applied to the payout break depending on the positional zone detected by the zone detector, the tether deployment amount and rate of change.

13. A computer implemented method for automatically controlling vehicle braking comprising:
attaching a retractable spool mountable to a vehicle, said retractable spool including a tether that pays out when a pulling force is applied to the tether, and retracts when the pulling force is removed, the tether includes a plurality of counting indications disposed at predetermined positions on the tether;
attaching a free end of the tether to a dog collar or dog harness;
moving the vehicle in a forward direction;
paying out or retracting the tether as the dog moves relative to the vehicle;
counting the counting indicators as the counting indicators pass by the counter;
determining a rate of change of the tether as a pay out rate or retraction rate of the end portion of the tether relative to a moving vehicle, a time period between counting indicators passing by the counter being indicative of a rate of change;
retrieving from a storage device a braking level that correspond with and a tether deployment amount and rate of change; and
applying to a breaking actuator the breaking level retrieved in the retrieving step.

14. The method according to claim 13, further comprising:
detecting a positional zone in which the dog is located relative to the bicycle, said positional zone being one of a plurality of zones; and
retrieving a different braking level depending on the positional zone detected in the detecting step.

15. The method according to claim 14, further comprising:
after detecting that the dog is located in a predetermined zone and the tether deployment amount and rate of change are within a predetermined range, producing an audible alarm and applying an electrical stimulus to the dog as a warning.

16. The method according to claim 15, wherein,
the audible alarm is produced a predetermined amount of time prior to applying the electrical stimulus.

17. The method according to claim 15, wherein
the producing the audible alarm step includes producing produces a plurality of sounds, each of the plurality of sounds corresponding to a different braking level.

18. The method according to claim 14, wherein:
the detecting a position zone step includes
following a motion of the dog with a hinged outlet; and
making electrical contact with respective of a plurality of contacts to detect one of the plurality of zones depending on a rotational position of the hinged outlet.

19. The method according to claim 13, wherein the step of attaching the retractable spool includes attaching the retractable spool to a bicycle.

20. The method according to claim 13, wherein the step of attaching the retractable spool includes attaching the retractable spool to an in-line skate.

* * * * *